United States Patent
Hirose et al.

(10) Patent No.: US 9,819,004 B2
(45) Date of Patent: Nov. 14, 2017

(54) CURRENT INTERRUPTION DEVICE AND ELECTRICITY STORAGE DEVICE INCLUDING SAME

(71) Applicant: KABUSHIKI KAISHA TOYOTA JIDOSHOKKI, Kariya-shi, Aichi (JP)

(72) Inventors: Takayuki Hirose, Kariya (JP); Motoaki Okuda, Kariya (JP); Hiroyasu Nishihara, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/120,248

(22) PCT Filed: Feb. 3, 2015

(86) PCT No.: PCT/JP2015/052966
§ 371 (c)(1),
(2) Date: Aug. 19, 2016

(87) PCT Pub. No.: WO2015/129404
PCT Pub. Date: Sep. 3, 2015

(65) Prior Publication Data
US 2017/0077483 A1    Mar. 16, 2017

(30) Foreign Application Priority Data
Feb. 26, 2014 (JP) .................. 2014-035810

(51) Int. Cl.
*H01M 2/34* (2006.01)
*H01M 2/30* (2006.01)
(Continued)

(52) U.S. Cl.
CPC ............. *H01M 2/345* (2013.01); *H01M 2/34* (2013.01); *H01M 10/0525* (2013.01); *H01M 10/4235* (2013.01); *H01M 2200/20* (2013.01)

(58) Field of Classification Search
CPC ...... H01M 2/04–2/0404; H01M 2/046; H01M 2/0473; H01M 2/06–2/08; H01M 2/12;
(Continued)

(56) References Cited

U.S. PATENT DOCUMENTS 4,879,187 A * 11/1989 Biegger .................. H01M 2/34
429/161
5,609,972 A * 3/1997 Kaschmitter ....... H01M 2/1241
429/56
(Continued)

FOREIGN PATENT DOCUMENTS

CN    101556993 A    10/2009
JP    9-17146 A    1/1997
(Continued)

OTHER PUBLICATIONS

Machine Translation of JP 10-208726, Tsukamoto (Aug. 1998).*
International Search Report for PCT/JP2015/052966 dated Apr. 7, 2015 [PCT/ISA/210].

*Primary Examiner* — Jonathan Crepeau
*Assistant Examiner* — Jacob Buchanan
(74) *Attorney, Agent, or Firm* — Sughrue Mion, PLLC (57) ABSTRACT

A current interruption device includes: a first conducting plate 90 configured to be electrically connected to a terminal; and a second conducting plate 88 disposed to face the first conducting plate and configured to be electrically connected to the electrode assembly. A center portion of the first conducting plate 90 and a center portion of the second conducting plate 88 are joined by a first welding portion. The second conducting plate 88 is configured to be fractured so as to interrupt the current flowing between the terminal and
(Continued)

the electrode assembly when the internal pressure of the casing exceeds the preset pressure. The first welding portion has a fuse function of interrupting the current flowing between the terminal and the electrode assembly by fusion of the first welding portion when the current flowing between the terminal and the electrode assembly exceeds a preset current.

9 Claims, 5 Drawing Sheets

(51) Int. Cl.
 *H01M 10/0525* (2010.01)
 *H01M 10/42* (2006.01)
(58) Field of Classification Search
 CPC .... H01M 2/1235–2/1241; H01M 2/34; H01M 2/345
 See application file for complete search history.

(56) References Cited

U.S. PATENT DOCUMENTS

| | | | |
|---|---|---|---|
| 5,860,611 A | | 1/1999 | Ikebe et al. |
| 2008/0038627 A1* | | 2/2008 | Yamauchi ............... H01M 2/34 429/53 |
| 2010/0330402 A1* | | 12/2010 | Wang ................. H01M 2/0408 429/53 |
| 2013/0196187 A1 | | 8/2013 | Yokoyama et al. |
| 2013/0196220 A1 | | 8/2013 | Okutani et al. |
| 2015/0079432 A1 | | 3/2015 | Okuda et al. |

FOREIGN PATENT DOCUMENTS

| | | | | |
|---|---|---|---|---|
| JP | 10208726 A | * | 8/1998 | ............. H01M 2/34 |
| JP | 11-144588 A | | 5/1999 | |
| JP | 2001-160382 A | | 6/2001 | |
| JP | 2013-157137 A | | 8/2013 | |
| JP | 2013-175428 A | | 9/2013 | |
| JP | 2013-191352 A | | 9/2013 | |
| WO | 2013/132704 A1 | | 9/2013 | |
| WO | 2013/154166 A1 | | 10/2013 | |
| WO | 2014/129462 A1 | | 8/2014 | |

\* cited by examiner

(12) United States Patent

CURRENT INTERRUPTION DEVICE AND ELECTRICITY STORAGE DEVICE INCLUDING SAME

TECHNICAL FIELD

This application is a National Stage of International Application No. PCT/JP2015/052966, filed on Feb. 3, 2015, which claims priority to Japanese Patent Application No. 2014-035810 filed on Feb. 26, 2014, the entire contents of which are hereby incorporated by reference into the present application. The present disclosure relates to a current interruption device and an electricity storage device including the same.

BACKGROUND ART

An electricity storage device may be provided with a current interruption device that interrupts conduction when overcharge or the like occurs. This types of current interruption device is usually provided on a current path connecting an electrode assembly and a terminal. When an internal pressure of a casing exceeds a preset pressure due to overcharge or the like, the current interruption device operates to interrupt the current path. This interrupts a current flowing through the current path.

Further, the electricity storage device may include a fuse that interrupts conduction when an excessive current flows through the electricity storage device (for example, see Japanese Patent Application Publication No. H09 (1997)-17146 A). In this electricity storage device, when an excessive current flows through the electricity storage device, the fuse is heated and fused so as to interrupt the current path. This prevents the excessive current from continuing to flow through the electricity storage device.

SUMMARY OF INVENTION

Technical Problem

There may be a difference between a case where overcharge or the like occurs in the electricity storage device and a case where an excessive current flows through the electricity storage device. For this reason, it is preferable, for higher safety of the electricity storage device, that the electricity storage device include both an current interruption device and a fuse function. However, including both the current interruption device and the fuse function as in the electricity storage device of Patent Literature 1 undesirably results in a complex structure accordingly. The present disclosure provides a technology that is simple in structure and yet can be equipped with both a current interruption device and a fuse function.

Solution to Problem

A current interruption device disclosed herein is provided in a current path connecting a terminal provided in a casing and an electrode assembly disposed within the casing. The current interruption device is configured to interrupt a current flowing between the terminal and the electrode assembly when an internal pressure of the casing exceeds a preset pressure. The current interruption device comprises: a first conducting plate configured to be electrically connected to the terminal; and a second conducting plate disposed to face the first conducting plate and configured to be electrically connected to the electrode assembly. A center portion of the first conducting plate and a center portion of the second conducting plate are joined by a first welding portion. The second conducting plate is configured to be fractured so as to interrupt the current flowing between the terminal and the electrode assembly when the internal pressure of the casing exceeds the preset pressure. The first welding portion has a fuse function of interrupting the current flowing between the terminal and the electrode assembly by fusion of the first welding portion when the current flowing between the terminal and the electrode assembly exceeds a preset current.

In the current interruption device described above, the first conducting plate and the second conducting plate are welded, and a part of the current path is constituted by the first conducting plate and the second conducting plate. Moreover, when the internal pressure of the casing exceeds the preset pressure due to overcharge or the like, the second conducting plate is fractured so as to interrupt the current path. Meanwhile, when an excessive current flows through the electricity storage device, a welding portion between the first conducting plate and the second conducting plate (i.e. the first welding portion) is fused so as to interrupt the current path. That is, the first welding portion has the fuse function. The utilization of the welding portion between the first conducting plate and the second conducting plate as a fuse makes it possible to restrain the structure from becoming complex.

DESCRIPTION OF EMBODIMENTS

Some preferred aspects of embodiments disclosed herein will be listed. It should be noted that elements described below may technically be useful alone.

(Aspect 1) In the current interruption device disclosed herein, an outer peripheral portion of the first conducting plate may be joined to the terminal by a second welding portion. In this case, the second welding portion may also have a fuse function of interrupting the current flowing between the terminal and the electrode assembly by fusion of the second welding portion when the current flowing between the terminal and the electrode assembly exceeds the preset current. Such a configuration makes it possible to, by including fuse functions at a plurality of places, more surely interrupt the current when an excessive current flows. Further, although the fuse functions are provided at the plurality of places, the utilization of the welding portions restrains the structure from becoming complex.

(Aspect 2) In the current interruption device disclosed herein, the first conducting plate may be urged in a direction away from the second conducting plate. Moreover, the first conducting plate may move away from the second conducting plate when the first welding portion is fused or the second conducting plate is fractured. Such a configuration makes it possible to better suppress re-conduction after the conduction has been interrupted.

(Aspect 3) In the current interruption device disclosed herein, a welding area of the first welding portion may be adjusted such that the first welding portion is fused when the current flowing between the terminal and the electrode assembly exceeds the preset current. Such a configuration makes it possible to achieve the fuse function by simply adjusting the welding area of the first welding portion, thus achieving a very simple structure.

(Aspect 4) In the current interruption device disclosed herein, an internal space accommodating the electrode assembly and electrolyte may be provided in the casing. Moreover, the first welding portion may be isolated from the internal space. Such a configuration makes it hard for heat generated by fusion of the first welding portion, if any, to be transmitted to the electrolyte. This in turn makes it possible to suppress a rise in temperature of the electrolyte.

EMBODIMENT

Figure 1:
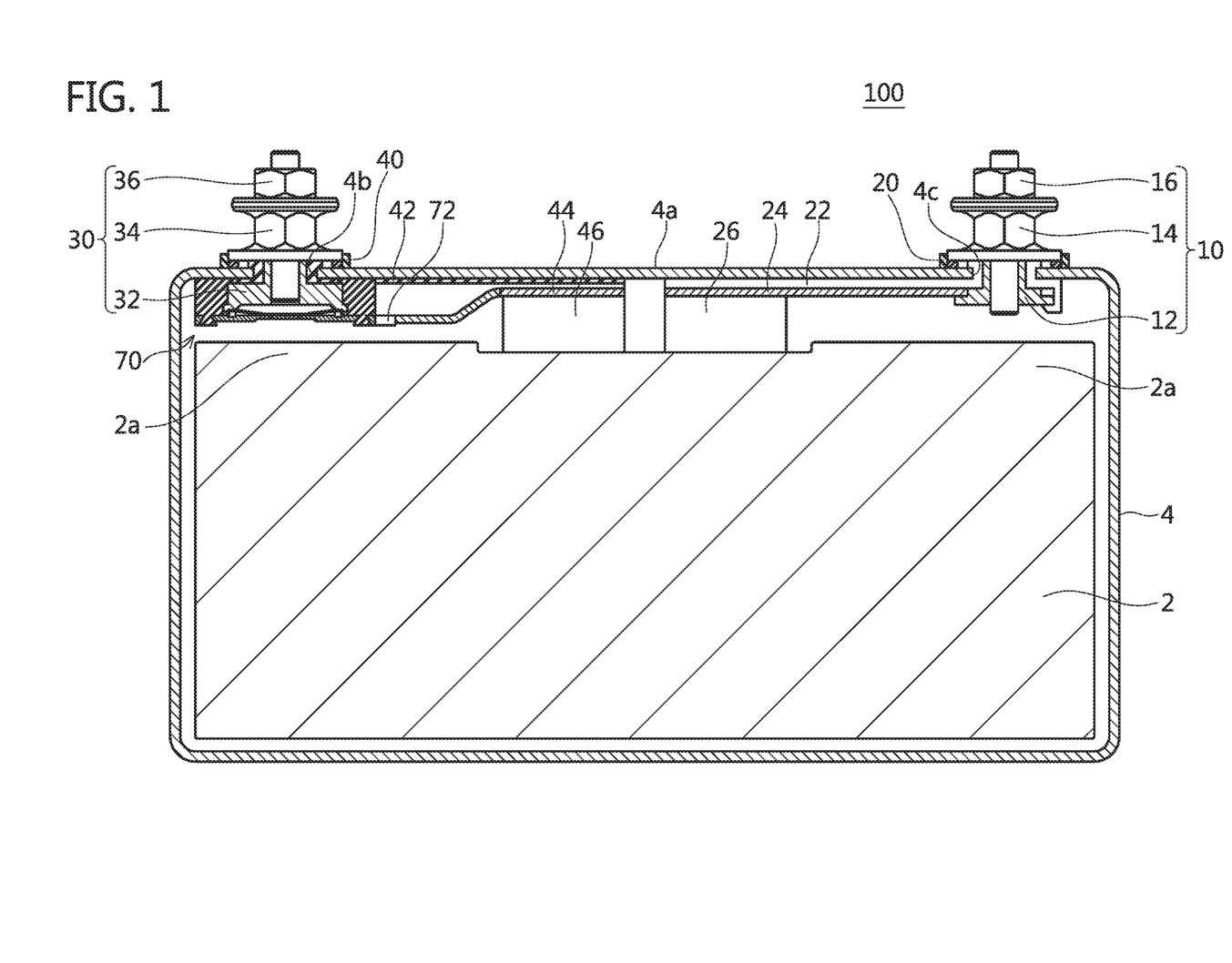
FIG. 1 is a cross-sectional view of an electricity storage device.

The following will describe an electricity storage device 100 according to an embodiment. The electricity storage device 100 is a lithium-ion rechargeable battery, which is a type of secondary battery. As shown in FIG. 1, the electricity storage device 100 includes a casing 4, an electrode assembly 2, a negative electrode terminal 30, a positive electrode terminal 10, and a current interruption device 70. The casing 4 is made of metal, and is substantially in the shape of a rectangular solid. In the casing 4, the electrode assembly 2 and the current interruption device 70 are accommodated. Further, in the casing 4, an electrolyte is contained. The casing 4 has an upper surface 4a to which the negative electrode terminal 30 and the positive electrode terminal 10 are attached. That is, the casing 4 has through-holes 4b and 4c formed in the upper surface 4a. The negative electrode terminal 30 is attached to the through-hole 4b, and the positive electrode terminal 10 is attached to the through-hole 4c. An insulating first sealing member 42 is placed in the through-hole 4b. An insulating second sealing member 22 is placed in the through-hole 4c. It should be noted that the casing 4 may be in any shape, such as a cylindrical shape, a cuboidal shape, or the shape of a sheet formed by a film.

The negative electrode terminal 30 includes an outer nut 36, an inner nut 32, and a bolt 34. The outer nut 36 is used for a wire connection between the negative electrode terminal 30 and a negative electrode wire (not illustrated). The inner nut 32 is attached to the first sealing member 42. A part of the inner nut 32 passes through the through-hole 4b. The bolt 34 is fastened to the inner nut 32. A third sealing member 40 is interposed between the bolt 34 and the casing 4. The negative electrode terminal 30 is insulated from the casing 4 by the sealing members 40 and 42. The inner nut 32 is electrically connected to a negative electrode lead 44 via the current interruption device 70 and a connection terminal 72. The negative electrode lead 44 is insulated from the casing 4 by the first sealing member 42. The negative electrode terminal 30 is electrically connected with a negative electrode of the electrode assembly 2 via the current interruption device 70, the connection terminal 72 and the negative electrode lead 44. The current interruption device 70 will be described later.

The positive electrode terminal 10 includes an outer nut 16, an inner nut 12, and a bolt 14. The outer nut 16 is used for a wire connection between the positive electrode terminal 10 and a positive electrode wire (not illustrated). The inner nut 12 is attached to the second sealing member 22. A part of the inner nut 12 passes through the through-hole 4c. The bolt 14 is fastened to the inner nut 12. A fourth sealing member 20 is interposed between the bolt 14 and the casing 4. The positive electrode terminal 10 is insulated from the casing 4 by the sealing members 20 and 22. A positive electrode lead 24 is fixed to the inner nut 12. The inner nut 12 and the positive electrode lead 24 are electrically connected to each other. The positive electrode lead 24 is insulated from the casing 4 by the second sealing member 22. The positive electrode terminal 10 is electrically connected with a positive electrode of the electrode assembly 2 via the positive electrode lead 24.

(Electrode Assembly)

The electrode assembly 2 includes the positive electrode, the negative electrode 2a, and a separator interposed between the positive electrode and the negative electrode. The positive electrode and the separator are not illustrated. The negative electrode 2a includes a negative electrode collector and a negative-electrode active material layer provided on the negative electrode collector. The negative electrode 2a has a negative-electrode collector tab 46 at an end thereof. The negative-electrode active material layer is not applied to the negative-electrode collector tab 46. The positive electrode includes a positive electrode collector and a positive-electrode active material layer provided on the positive electrode collector. The positive electrode has a positive-electrode collector tab 26 at an end thereof. The positive-electrode active material layer is not applied to the positive-electrode collector tab 26. It should be noted that materials (such as active materials, binders, and conductive auxiliary agents) that are contained in the active material layers are not limited to particular materials, and materials that are used in the electrodes of publicly-known electricity storage devices and the like may be used.

Note here that, as the positive electrode collector, for example, aluminum (Al), nickel (Ni), titanium (Ti), stainless steel, or a composite material or alloy thereof may be used. In particular, aluminum or a composite material or alloy containing aluminum is preferred. Further, as the positive-electrode active material, $Li_2MnO_3$, $Li(NiCoMn)_{0.33}O_2$, $Li(NiMn)_{0.5}O_2$, $LiMn_2O_4$, $LiMnO_2$, $LiNiO_2$, $LiCoO_2$, $LiNi_{0.8}Co_{0.15}Al_{0.05}O_5$, $Li_2MnO_2$, $LiMn_2O_4$, or the like may be used, provided that the positive-electrode active material is a material that allows lithium-ion penetration and desorption. Alternatively, an alkali metal such as lithium or sodium, sulfur, or the like may be used as the positive-electrode active material. These materials may be used alone or in any combination thereof. The positive-electrode active material is applied to the positive electrode collector together with a conducting material, a binding agent, and the like as needed.

Meanwhile, as the negative electrode collector, aluminum, nickel, copper (Cu), or a composite material or alloy thereof may be used. In particular, copper or a composite material or alloy containing copper is preferred. Further, as the negative-electrode active material, a material that allows lithium-ion penetration and desorption may be used. An alkali metal such as lithium (Li) or sodium (Na), a transition metal oxide containing an alkali metal, a carbon material such as natural graphite, mesocarbon microbeads, highly-oriented graphite, hard carbon, or soft carbon, or elemental silicon, a silicon-containing alloy, or a silicon-containing oxide may be used. The negative-electrode active material is applied to the negative electrode collector together with a conducting material, a binding agent, and the like as needed.

It should be noted that the separator may be a porous separator having insulating properties. As the separator, a porous film made of polyolefin resin such as polyethylene (PE) or polypropylene (PP) may be used. Alternatively, woven fabric or nonwoven fabric made of polypropylene, polyethylene terephthalate (PET), methyl cellulose, or the like may be used.

Further, it is preferable that the electrolyte be a non-aqueous electrolyte prepared by dissolving a supporting salt (electrolyte) in a non-aqueous solvent. Usable examples of the non-aqueous solvent include: a solvent containing a chain ester such as ethylene carbonate (EC), propylene carbonate (PC), dimethyl carbonate (DMC), diethyl carbonate (DEC), or ethyl methyl carbonate (EMC); a solvent such as ethyl acetate or methyl propionate; and a mixture thereof. Further, usable examples of the supporting salt (electrolyte) include $LiPF_6$, $LiBF_4$, and $LAsF_6$.

(Current Interruption Device)

The current interruption device 70 will be described with reference to FIGS. 2 to 5. The current interruption device 70 is connected between the negative electrode terminal 30 and the negative-electrode collector tab (negative electrode) 46. It should be noted that the current interruption device 70 may be disposed on a current path connecting the positive electrode and the positive electrode terminal 10, a current path connecting the negative electrode and the negative electrode terminal 30, or both. It should be noted that FIGS. 2 to 4 omit to illustrate the sealing member 42 interposed between the negative electrode terminal 30 and the casing 4.

Figure 2:
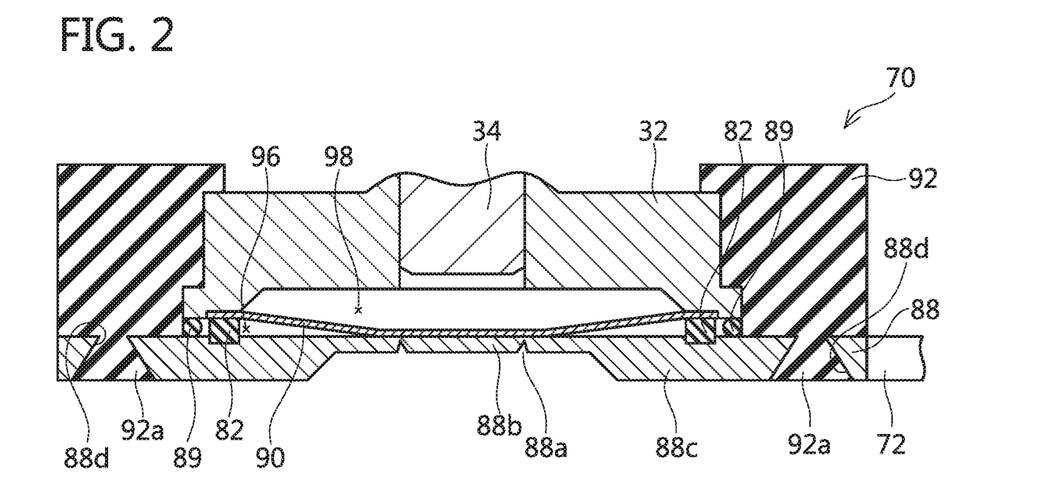
FIG. 2 is a diagram showing a current interruption device, in which a terminal and an electrode are electrically connected with each other.

As shown in FIG. 2, the current interruption device 70 includes a fracture plate 88 made of metal, an inversion plate 90 made of metal, and a supporting member 92 having insulating properties. The supporting member 92 is made of a thermoplastic resin (e.g. PPS). The supporting member 92 is in the shape of a cylinder, and inside of the supporting member 92, a space accommodating a lower end of the inner nut 32 and the inversion plate 90 is provided. The supporting member 92 has an upper end fitted on an upper surface of the lower end of the inner nut 32. The supporting member 92 has a lower surface on which a thermal caulking boss 92a is provided. The thermal caulking boss 92a is inserted and fixed in a through-hole 88d of the fracture plate 88. That is, the thermal caulking boss 92a is heated in a state of being inserted in the through-hole 88d of the fracture plate 88, and is deformed in conformance with the shape of the through-hole 88d. This causes the fracture plate 88 to be fixed onto a lower surface of the supporting member 92. In a state where the supporting member 92 is fixed to the fracture plate 88, the lower end of the inner nut 32 and the inversion plate 90 are accommodated inside of the supporting member 92. This causes the supporting member 92 to support the inversion plate 90 and the fracture plate 88 in a state where the inversion plate 90 and the fracture plate 88 are stacked, and also causes the current interruption device 70 to be fixed to the inner nut 32. It should be noted that a sealing member 89 is disposed between the fracture plate 88 and the lower end of the inner nut 32. The sealing member 89 is a ring-shaped member having a circular cross-section. The sealing member 89 is in contact with the lower end of the inner nut 32 and the fracture plate 88 and seals the space therebetween.

The fracture plate 88 is a circular plate member, and is disposed below the supporting member 92. The connection terminal 72 is connected to a part of an outer peripheral portion of the fracture plate 88. A groove portion 88a is provided in the center of a lower surface of the fracture plate 88. The groove portion 88a is in the shape of a circle in a bottom view. Further, as shown in FIG. 2, a cross-section of the groove portion 88a is in the shape of a triangle whose vertex points upward. The provision of the groove portion 88a causes the mechanical strength of the fracture plate 88 in a position where the groove portion 88a is provided to be lower than the mechanical strength of the fracture plate 88 in a position other than the groove portion 88a. The fracture plate 88 is partitioned by the groove portion 88a into a center portion 88b surrounded by the groove portion 88a and an outer peripheral portion 88c located on an outer peripheral side of the groove portion 88a. The center portion 88b is thin in plate thickness, and the outer peripheral portion 88c is great in plate thickness.

Figure 5:
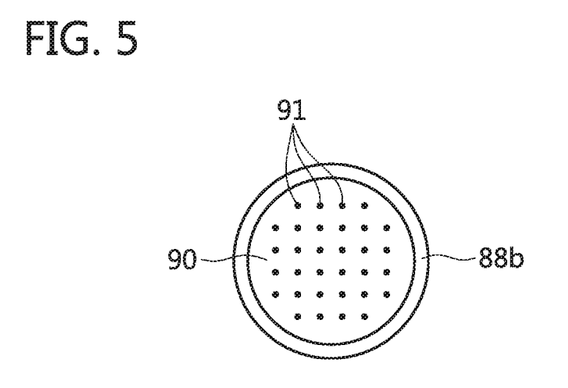
FIG. 5 is an enlarged plan view of a welding portion.

The inversion plate 90 is a circular plate member, and is disposed above the fracture plate 88. A center portion of the inversion plate 90 is convex downward in the state shown in FIG. 2, and is fixed to the center portion 88b of the fracture plate 88. Specifically, the center portion of the inversion plate 90 is joined to the center portion 88b of the fracture plate 88 by welding. An area (welding area) of a welding portion between the inversion plate 90 and the fracture plate 88 is set such that the welding portion is fused when a current flowing through the welding portion exceeds a preset current. Specifically, as shown in FIG. 5, the center portion of the inversion plate 90 and the center portion 88b of the fracture plate 88 are welded at a plurality of welding points 91. The welding points 91 indicate positions irradiated with laser light, and are placed at intervals in a longitudinal direction and a transverse direction of FIG. 5. At each of the welding points 91, the inversion plate 90 and the fracture plate 88 are joined. Therefore, the welding area between the inversion plate 90 and the fracture plate 88 can be adjusted by adjusting the number of welding points 91 (i.e. the number of points at which laser welding is performed). A change in the welding area between the inversion plate 90 and the fracture plate 88 leads to a change in resistance of the welding portion. That is, an increase in the welding area leads to a decrease in resistance, and a decrease in the welding area leads to an increase in resistance. A change in resistance of the welding portion leads to a change in Joule heat when the current flows through the welding portion. Therefore, by adjusting the welding area between the inversion plate 90 and the fracture plate 88 (i.e. adjusting the number of welding points 91), the welding portion can be fused when the current flowing through the welding portion exceeds the preset current.

Further, an outer peripheral portion of the inversion plate 90 is joined to the lower end of the inner nut 32 by welding. A welding portion between the inversion plate 90 and the inner nut 32 is provided on the whole circumference of the outer peripheral portion of the inversion plate 90. As is clear from the foregoing, the negative terminal 30 is connected to the electrode assembly 2 via the inversion plate 90, the fracture plate 88, the connection terminal 72, and the negative electrode lead 44. A space 98 is provided between an upper surface of the inversion plate 90 and a lower surface of the inner nut 32, and the space 98 is sealed from the space in the casing 4. An insulating member 82 is disposed between the inversion plate 90 and the fracture plate 88. The insulating member 82 is a ring-shaped member, is in contact with the outer peripheral portion of the inversion plate 90 and the outer peripheral portion of the fracture plate 88, and insulates them from each other. A space 96 between the inversion plate 90 and the fracture plate 88 communicates with the space in the casing 4 in a position (not illustrated). Therefore, a pressure of the space in the casing 4 acts on a lower surface of the inversion plate 90, and a pressure of the space 98 isolated from the space in the casing 4 acts on the upper surface of the inversion plate 90. Since the space 98 is isolated from the space in the casing 4, a rise in the pressure of the space in the casing 4 makes a pressure to act on the upper surface of the inversion plate 90 different from a pressure to act on the lower surface of the inversion plate 90.

It should be noted that the inversion plate 90 is held between the insulating member 82 and the inner nut 32 in a state of being urged in a direction away from the fracture plate 90. For this reason, the inversion plate 90 moves away from the fracture plate 88 when the fracture plate 88 is fractured at the groove portion 88a or the welding portion between the inversion plate 90 and the fracture plate 88 is fused.

Figure 3:
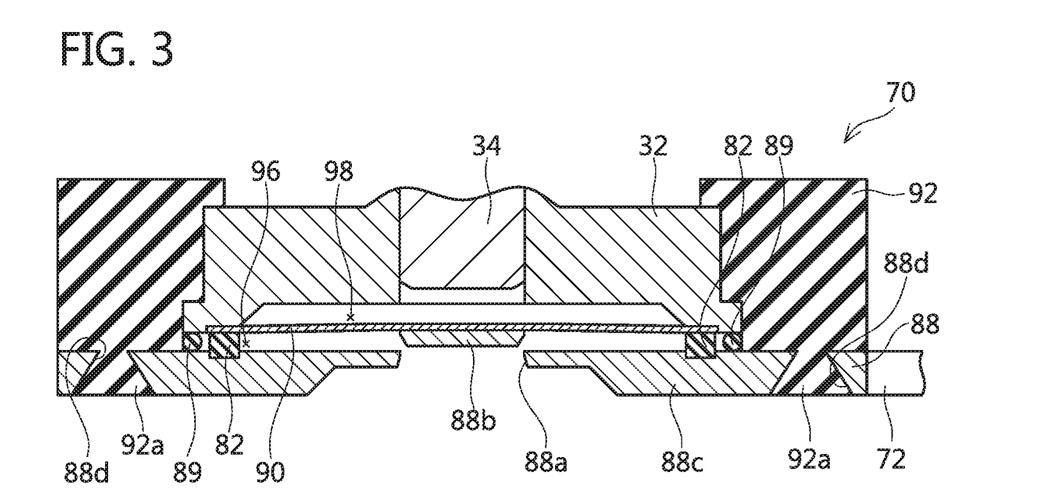
FIG. 3 is a diagram showing the current interruption device, in which the conduction between the terminal and the electrode has been interrupted due to a rise in an internal pressure of a casing.

The electricity storage device 100 is configured such that, in the state shown in FIG. 2, the negative electrode terminal 30 and the negative-electrode collector tab 46 (negative electrode) are electrically connected with each other, and the positive electrode terminal 10 and the positive-electrode collector tab 26 (positive electrode) are electrically connected with each other. This allows conduction between the negative electrode terminal 30 and the positive electrode terminal 10. When the internal pressure of the casing 4 rises to exceed a predetermined pressure (preset pressure) set in advance, the fracture plate 88 is fractured at the groove portion 88a as shown in FIG. 3 so as to interrupt a current path between the outer peripheral portion 88c of the fracture plate 88 and the inversion plate 90 (inner nut 32). That is, a rise in the internal pressure of the casing 4 leads to a rise in the pressure acting on the lower surface of the inversion plate 90 (state shown in FIG. 2). Since the space 98 is isolated from the space in the casing 4, the pressure acting on the upper surface of the inversion plate 90 (i.e. the pressure of the space 98) is hardly affected by the rise in the pressure of the space in the casing 4. For this reason, when the internal pressure of the casing 4 exceeds the predetermined pressure, the inversion plate 90 is inverted to change from a downwardly convex state to an upwardly convex state. Then, the fracture plate 88 is fractured at the groove portion 88a, and the inversion plate 90 and the center portion of the fracture plate 88 are displaced upward (state shown in FIG. 3). This interrupts the current path connecting the fracture plate 88 and the inversion plate 90, thus interrupting the conduction between the electrode assembly 2 and the negative electrode terminal 30. Further, since the inversion plate 90 is urged in a direction away from the fracture plate 88, the urging force causes the inversion plate 90 to move away from the fracture plate 88 when the fracture plate 88 is fractured. For this reason, the inversion plate 90 is retained by the urging force in a position away upward from the fracture plate 88, thus allowing the state where the conduction between the electrode assembly 2 and the negative electrode terminal 30 is interrupted to be maintained.

Figure 4:
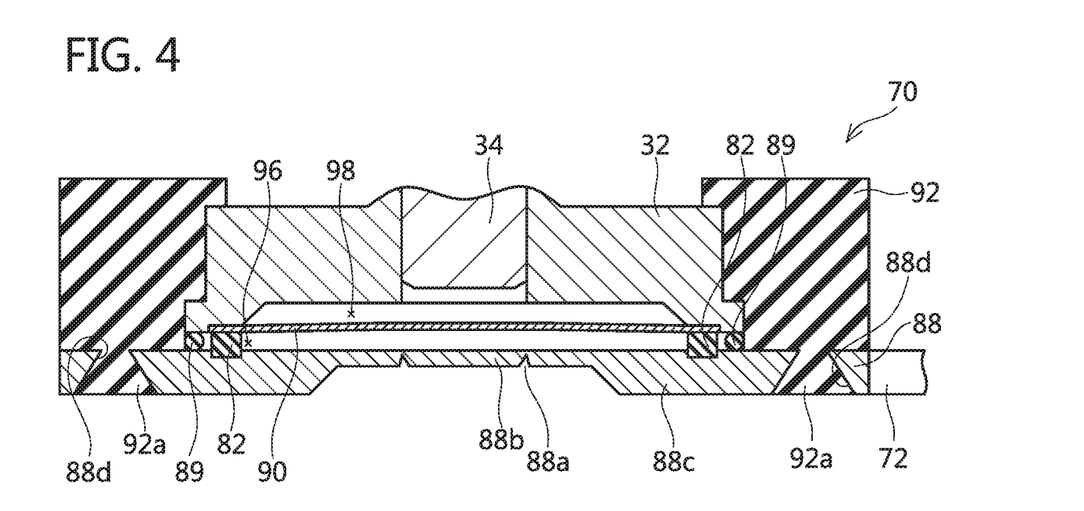
FIG. 4 is a diagram showing the current interruption device, in which the conduction between the terminal and the electrode has been interrupted due to a flow of an excessive current through the electricity storage device.

Further, in the electricity storage device 100 according to the present embodiment, the welding portion between the inversion plate 90 and the fracture plate 88 is fused when the current flowing between the electrode assembly 2 and the negative electrode terminal 30 exceeds the preset current. Since the inversion plate 90 is urged in a direction away from the fracture plate 88, the inversion plate 90 moves upward away from the fracture plate 88 as shown in FIG. 4 when the welding portion between the inversion plate 90 and the fracture plate 88 is fused. This interrupts the current path connecting the electrode assembly 2 and the negative electrode terminal 30.

As is clear from the foregoing, in the electricity storage device 100 according to the present embodiment, adjusting the welding area of the welding portion between the inversion plate 90 and the fracture plate 88 imparts a fuse function to the welding portion between the inversion plate 90 and the fracture plate 88. This makes it unnecessary to prepare a separate component having a fuse function and make it only necessary to adjust the welding area of the welding portion, thus making it possible to impart a fuse function to the electricity storage device 100 with a very simple configuration.

Finally, correspondence relationships between the embodiment described above and the recitations in the claims are mentioned. The inversion plate 90 is an example of the "first conducting plate", and the fracture plate 88 is an example of the "second conducting plate".

A specific example of the art disclosed herein has been described in detail; however, this is a mere exemplary indication and thus does not limit the scope of the claims. The art described in the claims includes modifications and variations of the specific example presented above.

For example, in the embodiment described above, a fuse function is imparted to the welding portion between the inversion plate 90 and the fracture plate 88. However, the art disclosed herein is not limited to such an example. For example, a fuse function may be further imparted to the welding portion between the inversion plate 90 and the inner nut 32. In this case, too, adjusting a welding area of the welding portion between the inversion plate 90 and the inner nut 32 allows the welding portion to be fused when the current flowing between the electrode assembly 2 and the negative electrode terminal 30 exceeds the preset current, thus making it possible to interrupt the current path between the electrode assembly 2 and the negative electrode terminal 30.

Further, in the embodiment described above, the inversion plate 90 is urged in a direction away from the fracture plate 88. However, the art disclosed herein is not limited to such an example. That is, the inversion plate 90 does not need to be urged in a direction away from the fracture plate 88. In this case, fusion of the welding portion between the inversion plate 90 and the fracture plate 88 causes a hole to be formed in the welding portion, whereby the conduction may be interrupted.

Figure 6:
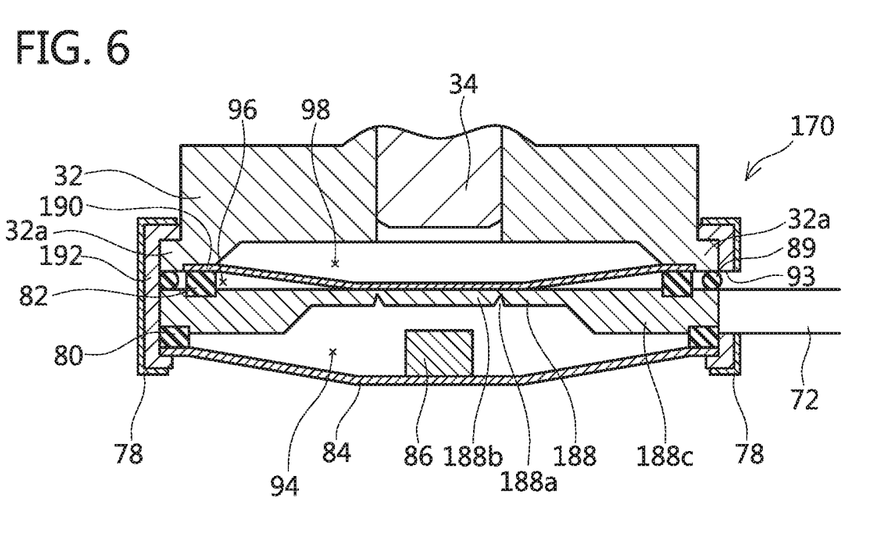
FIG. 6 is a diagram showing another example of a current interruption device.

Further, in the embodiment described above, the current interruption device 70 includes two plate members, namely the fracture plate 88 and the inversion plate 90. However, the configuration of the current interruption device is not limited to such a configuration. For example, as shown in FIG. 6, a current interruption device 170 may include three plate members, namely a first inversion plate 84, a fracture plate 188, and a second inversion plate 190. That is, in the current interruption device 170, a supporting member 192 is fitted onto the first inversion plate 84, the fracture plate 188, and the second inversion plate 190 from outside so as to support the first inversion plate 84, the fracture plate 188, and the second inversion plate 190 in a state where the first inversion plate 84, the fracture plate 188, and the second inversion plate 190 are stacked to face each other. A plate member 78 made of metal is attached to an outer peripheral surface of the supporting member 192. Specifically, the plate member 78 is fitted onto the outer peripheral surface of the supporting member 192 in a state where the supporting member 192 holds the first inversion plate 84, the fracture plate 188, the second inversion plate 190, and the lower end 32a of the inner nut 32 between the upper and lower parts of the supporting member 192. An opening 93 is provided in a part of the outer peripheral surfaces of the supporting member 192 and the plate member 78 in a circumferential direction. The opening 93 communicates with the space in the casing 4, and the connection terminal 72 is disposed in the opening 93. This allows the fracture plate 188 and the negative electrode lead 44 to be connected to each other via the connection terminal 72.

The first inversion plate 84 is a circular plate, and is disposed below the fracture plate 188. A lower surface of an outer peripheral edge of the first inversion plate 84 is supported by the supporting member 192 over the whole circumference. An insulating member 80 is disposed on an upper surface of the outer peripheral edge of the first inversion plate 84. The insulating member 80 is a ring-shaped member, and insulates the first inversion plate 84 and the fracture plate 188 from each other. Further, a protruding portion 86 is provided on an upper surface of the first inversion plate 84, and the protruding portion 86 is located in the center of the first inversion plate 84. The protruding portion 86 protrudes upward toward the fracture plate 188. It should be noted that the pressure of the space in the casing 4 acts on a lower surface of the first inversion plate 84, and a pressure of the space 94 between the first inversion plate 84 and the fracture plate 188 acts on the upper surface of the first inversion plate 84. Since the space 94 and the space in the casing 4 are sealed, a rise in the pressure of the space in the casing 4 causes different pressures to act on the upper and lower surfaces of the first inversion plate 84.

The fracture plate 188 is a circular plate, and is disposed between the first inversion plate 84 and the second inversion plate 190. The connection terminal 72 is connected to a part of an outer peripheral portion 188c of the fracture plate 188. The fracture plate 188 has a groove portion 188a formed in the center of a lower surface of the fracture plate 188, and the groove portion 188a is lower in mechanical strength. The second inversion plate 190 is a circular plate, and is disposed above the fracture plate 188. A center portion of the second inversion plate 190 is welded to a center portion 188b of the fracture plate 188. As in the embodiment described above, an area (welding area) of a welding portion between the second inversion plate 190 and the fracture plate 188 is set such that the welding portion is fused when a current flowing through the welding portion exceeds a preset current.

In the current interruption device 170 described above, too, the pressure acting on the lower surface of the first inversion plate 84 rises when the internal pressure of the casing 4 rises to exceed a predetermined pressure (preset pressure) set in advance. Since the space 94 is isolated from the space in the casing 4, the first inversion plate 84 is inverted to change from a downwardly convex state to an upwardly convex state when the internal pressure of the casing 4 exceeds the predetermined pressure. This causes the protruding portion 86 of the first inversion plate 84 to hit the center portion 188b of the fracture plate 188 to fracture the fracture plate 188 at the groove portion 188a. This interrupts the current path connecting the fracture plate 188 and the second inversion plate 190.

Further, the welding portion between the second inversion plate 190 and the fracture plate 188 is fused when the current flowing between the electrode assembly 2 and the negative electrode terminal 30 exceeds the preset current. This interrupts the current path connecting the fracture plate 188 and the second inversion plate 190. It should be noted that the spaces 94, 96, and 98 are isolated from the space in the casing 4. For this reason, the welding portion between the second inversion plate 190 and the fracture plate 188 is disposed in a space isolated from the space in the casing 4. This restrains heat from the welding portion from being transmitted to the electrolyte in the casing 4, thus making it possible to restrain the electrolyte from becoming hot.

Figure 7:
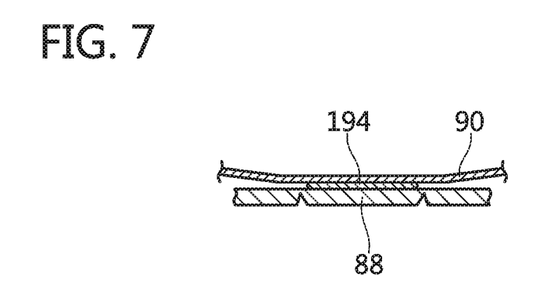
FIG. 7 is an enlarged cross-sectional view showing another example of the welding portion.

Further, in the embodiment described above, a fuse function is imparted by adjusting the welding area of the welding portion between the inversion plate 90 and the fracture plate 88. However, the art disclosed herein is not limited to such an example. For example, the inversion plate 90 and the fracture plate 88 may be joined via a metal layer 194, and only the metal layer 194 may be fused. That is, the metal layer 194 is formed by a metal (e.g. solder) that is lower in melting point than the inversion plate 90 and the fracture plate 88. Then, when a current exceeding the preset current flows between the inversion plate 90 and the fracture plate 88, the metal layer 194 may be fused so that the inversion plate 90 and the fracture plate 88 move away from each other. Such a configuration, too, makes it possible to impart a fuse function to the welding portion between the inversion plate 90 and the fracture plate 88.

Figure 8:
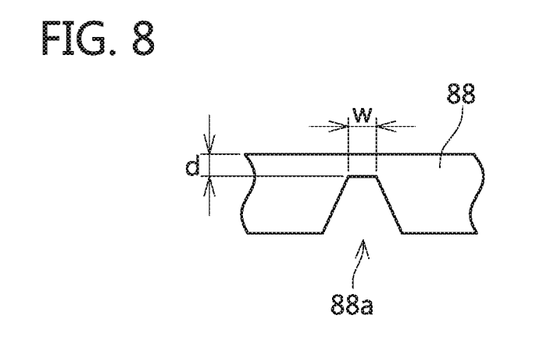
FIG. 8 is an enlarged view showing a groove portion in a fracture plate.

Alternatively, as shown in FIG. 8, by adjusting the thickness d and width w of the groove portion 88a provided in the fracture plate 88 and thereby adjusting the resistance of the groove portion 88a, a fuse function may be imparted to the groove portion 88a. That is, the resistance can be adjusted by adjusting the shape of the groove portion 88a without adjusting the resistance of the welding portion, and a fuse function can be imparted to the welding portion.

The technical elements explained in the present description or drawings exert technical utility independently or in combination of some of them, and the combination is not limited to one described in the claims as filed. Moreover, the technology exemplified in the present description or drawings achieves a plurality of objects at the same time, and has technical utility by achieving one of such objects.

What is claimed is:

1. A current interruption device provided in a current path connecting a terminal provided in a casing and an electrode assembly disposed within the casing, the current interruption device configured to interrupt a current flowing between the terminal and the electrode assembly when an internal pressure of the casing exceeds a preset pressure, the current interruption device comprising:
   a first conducting plate configured to be electrically connected to the terminal; and
   a second conducting plate disposed to face the first conducting plate and configured to be electrically connected to the electrode assembly,
   wherein
   a center portion of the first conducting plate and a center portion of the second conducting plate are joined by a first welding portion,
   the second conducting plate includes a part on an outer peripheral side of the first welding portion,
   a mechanical strength of the part is set lower than mechanical strengths of other parts than the-part in the second conducting plate,
   the second conducting plate is configured to be fractured at the part so as to interrupt the current flowing between the terminal and the electrode assembly when the internal pressure of the casing exceeds the preset pressure, and the first welding portion has a fuse function of interrupting the current flowing between the terminal and the electrode assembly by fusion of the first welding portion in which the first conducting plate is separated from the second conducting plate by movement of the first conducting plate away from the second conducting plate when the current flowing between the terminal and the electrode assembly exceeds a preset current.

2. The current interruption device as of claim 1, wherein an outer peripheral portion of the first conducting plate is joined to the terminal by a second welding portion, and the second welding portion also has a fuse function of interrupting the current flowing between the terminal and the electrode assembly by fusion of the second welding portion when the current flowing between the terminal and the electrode assembly exceeds the preset current.

3. The current interruption device as of claim 1, wherein the first conducting plate is urged in a direction away from the second conducting plate, and the first conducting plate moves away from the second conducting plate when the first welding portion is fused or the second conducting plate is fractured.

4. The current interruption device as of claim 1, wherein a welding area of the first welding portion is adjusted such that the first welding portion is fused when the current flowing between the terminal and the electrode assembly exceeds the preset current.

5. The current interruption device as of claim 1, wherein an internal space accommodating the electrode assembly and electrolyte is provided in the casing, and the first welding portion is isolated from the internal space.

6. An electricity storage device comprising:
a casing;
a terminal provided in the casing;
an electrode assembly disposed within the casing; and
a current interruption device provided in a current path connecting the terminal and the electrode assembly, the current interruption device configured to interrupt a current flowing between the terminal and the electrode assembly when an internal pressure of the casing exceeds a preset pressure, the current interruption device comprising:

a first conducting plate configured to be electrically connected to the terminal; and
a second conducting plate disposed to face the first conducting plate and configured to be electrically connected to the electrode assembly,
wherein
a center portion of the first conducting plate and a center portion of the second conducting plate are joined by a first welding portion,
the second conducting plate includes a part on an outer peripheral side of the first welding portion,
a mechanical strength of the part is set lower than mechanical strengths of other parts than the part in the second conducting plate,
a second conducting plate is configured to be fractured at the part so as to interrupt the current flowing between the terminal and the electrode assembly when the internal pressure of the casing exceeds the preset pressure, and
the first welding portion has a fuse function of interrupting the current flowing between the terminal and the electrode assembly by fusion of the first welding portion in which the first conducting plate is separated from the second conducting plate by movement of the first conducting plate away from the second conducting plate when the current flowing between the terminal and the electrode assembly exceeds a preset current.

7. The current interruption device of claim 1, wherein the first welding portion includes a plurality of welding points.

8. The electricity storage device of claim 6, wherein the first welding portion includes a plurality of welding points.

9. The electricity storage device of claim 6, wherein an outer peripheral portion of the first conducting plate is joined to the terminal by a second welding portion, and the second welding portion also has a fuse function of interrupting the current flowing between the terminal and the electrode assembly by fusion of the second welding portion when the current flowing between the terminal and the electrode assembly exceeds the preset current.

* * * * *